(12) United States Patent
Emami

(10) Patent No.: US 8,392,514 B2
(45) Date of Patent: Mar. 5, 2013

(54) VCC SOFTWARE ENHANCEMENT SYSTEM

(76) Inventor: Dion Emami, Anaheim, CA (US)

( * ) Notice: Subject to any disclaimer, the term of this patent is extended or adjusted under 35 U.S.C. 154(b) by 274 days.

(21) Appl. No.: 12/398,101

(22) Filed: Mar. 4, 2009

(65) Prior Publication Data

US 2010/0228828 A1    Sep. 9, 2010

(51) Int. Cl.
  *G06F 15/16* (2006.01)
(52) U.S. Cl. .................................... 709/206; 709/203
(58) Field of Classification Search .................. 709/206, 709/203
  See application file for complete search history.

(56) References Cited

U.S. PATENT DOCUMENTS

| | | | | |
|---|---|---|---|---|
| 6,192,396 | B1 * | 2/2001 | Kohler | 709/206 |
| 6,247,045 | B1 * | 6/2001 | Shaw et al. | 709/207 |
| 6,529,942 | B1 * | 3/2003 | Gilbert | 709/206 |
| 7,529,940 | B1 * | 5/2009 | Winkel et al. | 713/170 |
| 7,552,185 | B1 * | 6/2009 | Kirzner et al. | 709/206 |
| 7,711,786 | B2 * | 5/2010 | Zhu et al. | 709/206 |
| 2003/0018724 | A1 * | 1/2003 | Mathewson et al. | 709/206 |
| 2005/0160292 | A1 * | 7/2005 | Batthish et al. | 713/201 |
| 2007/0083675 | A1 * | 4/2007 | Vemulapelli et al. | 709/246 |
| 2009/0043862 | A1 * | 2/2009 | Bordia | 709/206 |
| 2009/0077178 | A1 * | 3/2009 | Callanan et al. | 709/206 |
| 2009/0214034 | A1 * | 8/2009 | Mehrotra et al. | 380/255 |
| 2009/0282494 | A1 * | 11/2009 | Bhide et al. | 726/28 |
| 2010/0023585 | A1 * | 1/2010 | Nersu et al. | 709/206 |
| 2010/0070592 | A1 | 3/2010 | Steuer et al. | |

* cited by examiner

*Primary Examiner* — Duyen Doan
(74) *Attorney, Agent, or Firm* — Heidi Eisenhut, Esq.; Loza & Loza, LLP

(57) ABSTRACT

The present invention relates to a system and method for preparing modified copies of outgoing electronic communications to secondary individual recipients and groups of secondary recipients. The system is referred to as a "Visible Carbon Copy" ("VCC"). Modifications can be made to the content of the communications and additionally to attachments included with the communications. Any number of differently modified copies can be sent to any number of secondary recipients or groups of recipients. The system can be interfaced into the users existing electronic messaging system or embedded into the electronic messaging system by the manufacturer thereof. In a first embodiment, the VCC is utilized with email messaging systems. In a second embodiment, the VCC is utilized with instant messaging systems. Additional embodiments allow utilization of the VCC with any type of electronic communication system that allows for messaging to one or more recipients.

10 Claims, 14 Drawing Sheets

Prior Art Server-Based Messaging System

Prior Art Point to Point Messaging System

Prior Art Mixing Messaging System

Modified VCC Messaging Systems
Server Based Systems

Modified VCC Messaging Systems
Point to Point Systems

Modified VCC Messaging Systems
Mixed Systems

Currently Developed User Interface Example

General Process

Application Examples

Add-in Development Example

Web Messaging VCC Application Embodiment

VCC Concept and Process

Flow Chart of VCC System

User Interface Embodiment

VCC SOFTWARE ENHANCEMENT SYSTEM

FIELD OF THE INVENTION

The present invention relates to transmission of electronic communications over electronic messaging systems. More particularly, it discloses a system and method by which the user of an electronic messaging system can send modified copies of electronic communications to one or more secondary recipients and groups of secondary recipients. The user can modify the message content and any attachments included with the communication. Any number of different modified copies of the communication can be sent to any number of secondary recipients or groups of recipients. The various messages can be prepared and previewed prior to transmission, and all of the varied messages can be sent at a single time to all recipients.

DESCRIPTION OF RELATED ART

Electronic messaging systems are essential tools for business and personal communications in today's global economy. Technological advances have made fast and efficient global communication possible through computer networking systems, including the worldwide web ("WWW"), local-area networks ("LAN"), and wide-area networks ("WAN"), cellular networks, instant messaging systems, and SMS and MMS systems. Users can send and receive electronic communications with other users who are located in close proximity or in remote places around the world. Present electronic messaging systems and methods allow a user to send a single message to one or more recipients.

Among the most commonly used electronic messaging systems are email application programs. These are typically configured to generate electronic messages in a memoranda format. The existing email application provides a platform for the user that shows separate fields for entering at least one email address to the main recipient (the "to" field), a brief topic title (the "subject" field), and a message field for insertion of the actual message text (the "body" field). The application may also provide two optional separate fields, one for entering at least one outgoing email addresses for recipients who will receive a "carbon copy" ("cc") of the message (which other recipients cannot review the recipient list), and one for entering at least one outgoing email addresses for recipients who will receive or a "blind carbon copy" ("bcc") (which other recipients cannot review the recipient list). It is also possible that the user will be allowed to designate a document, file, or executable program to be attached to and sent with the email communication. When the user finishes entering the message, topic, and outgoing email addresses, the user clicks on the "send" key to transmit.

A known email communications system and method for transmission of electronic messages between networks is comprised of at least one computer connected to at least one other computer network that connects to an email communication system. Each computer can send email communications to any of the other computers, the email messages being routed through the email communication system.

The email communication system and method is similar to other electronic messaging systems and methods in the process that followed for the composing, transmission, and reception of electronic messages. After a single communication has been sent, the sending user can continue to compose another single message and transmit it to at least one outgoing recipient's addresses, and another communication, and another one, and so forth. Each time, the address information and the data information is divided and stored by the transmitting and receiving recipients.

The current messaging systems allow single content to be sent to one or many users. You cannot modify the content addressed to different recipients without creating a new message. This is a very laborious process for sending a message to many recipients using different visible content.

There is a need for a means of electronic messaging that permits the user to vary the message content and attachments included with the message for purposes of sending similar but modified messages to secondary recipients. Such an add-on to current electronic messaging systems and methods would make messaging more convenient and efficient, saving significant time and labor for users who need to send variations on what are otherwise similar messages.

SUMMARY OF THE INVENTION

In light of the difficulties described previously with sending modified electronic communications, there is a need for variable messaging that can be transmitted to secondary recipients. The present invention discloses "Visible Carbon Copy" ("VCC") messaging. By this invention, a user first composes a new message or a reply message to an existing message within the users existing electronic messaging application or system. The user assigns the message to at least one outgoing address. The user may additionally assign it to recipients of carbon copies and blind carbon copies.

The present invention adds an interface into the user's electronic messaging application so that, before the message is sent, the user may additionally specify at least one outgoing address (the "VCC" recipient"). Said VCC recipient will receive a similar but modified version of the message or the message with extra content and attachments visible to the VCC recipient only. The user may continue to select at least one outgoing address for more modified versions of the existing message, at least to the technological limits of the software or hardware. The user may also include attachments as desired, and the list of attachments may be changed for each VCC recipient. The user can also send a message to recipient without others viewing the recipient list, called a "visible blind carbon copy" or "VBCC."

Prior to sending, the user may preview all of the messages and groups selected. Finally, the user selects the sending function, at which time all messages are sent to all recipients, specifically to the primary recipient and VCC recipient.

The present invention will interface with all electronic messaging systems and devices. According to the first aspect of the present invention, the system and method are used within email messaging systems. Another embodiment of this invention can be used within devices that utilize electronic messaging, such as cell phones. These and other embodiments are further described subsequently.

An object of the present invention is to provide an electronic messaging system and method by which the user is able to modify a message for purposes of sending the modified message to secondary recipients at the same time as the unaltered message may be sent to at least one primary recipient.

Another object of the present invention is to provide an electronic messaging system and method by which the user is able to remove, modify, and add attached files, documents, and executable programs attached to an electronic message for a VCC recipient and send the message with altered attachments list at the same time as the message with attachments is transmitted to the primary recipient.

Another object of the present invention is to interface within electronic messaging systems that are already in current use in a way that is user-friendly and time-efficient, and further that can be embedded into the messaging system or utilized as a plug-in add-on to the system.

DETAILED DESCRIPTION OF PREFERRED EMBODIMENTS

The present invention is described here in more detail with reference to the drawings. The drawings comprise schematic and flow diagrams of preferred embodiments of the present invention and of the prior art.

Figure 1A:
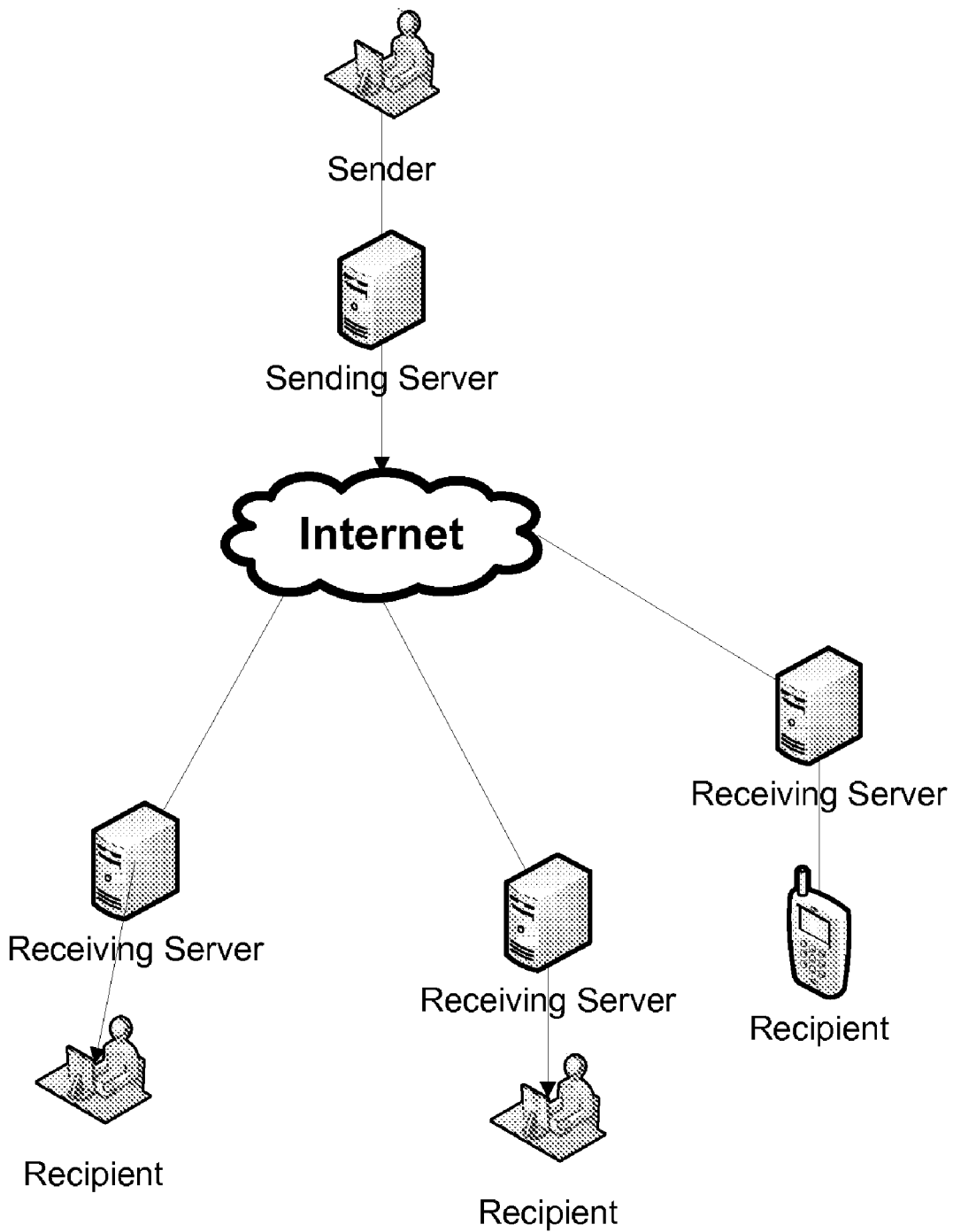
FIGS. 1A-1C are schematic diagrams of known email communications and computer systems.
Figure 1B:
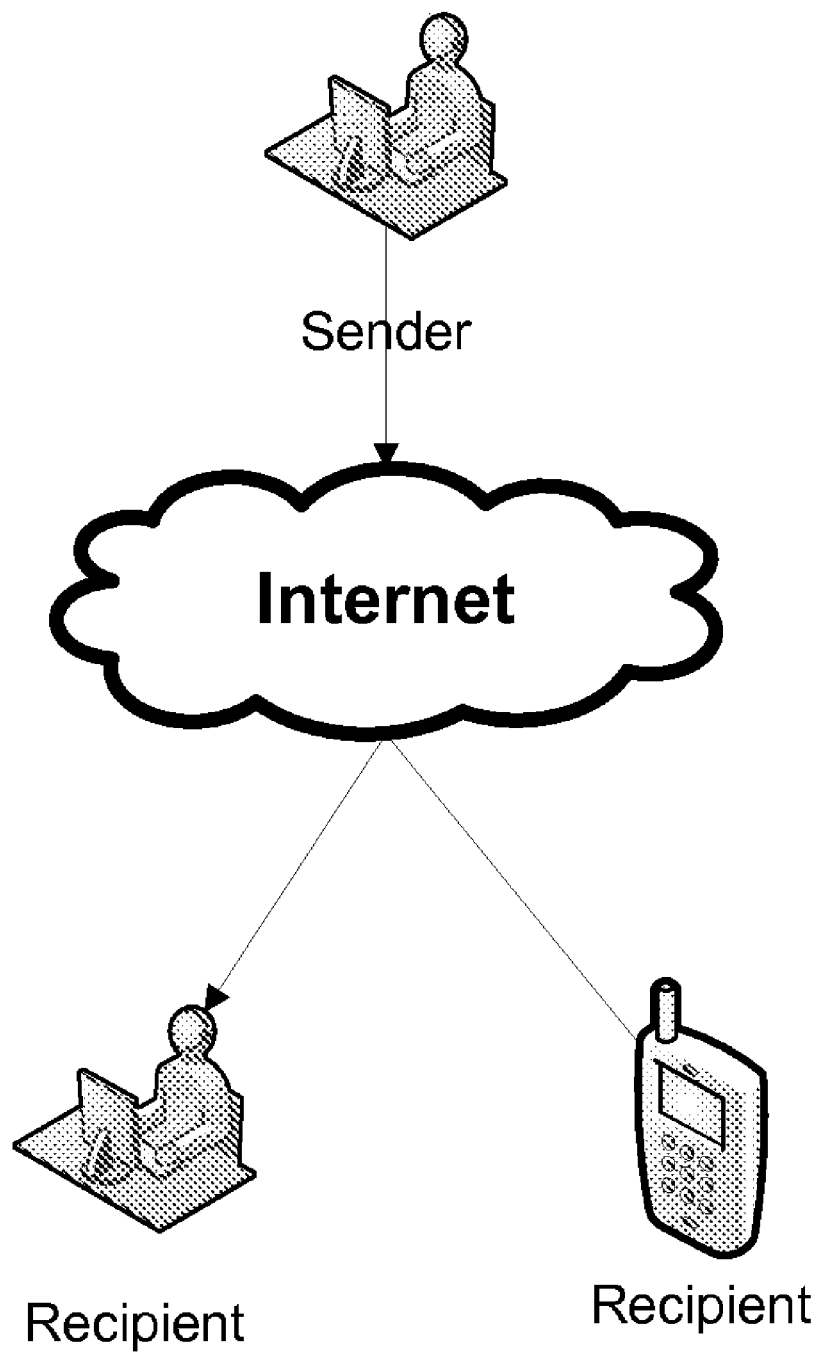
Figure 1C:
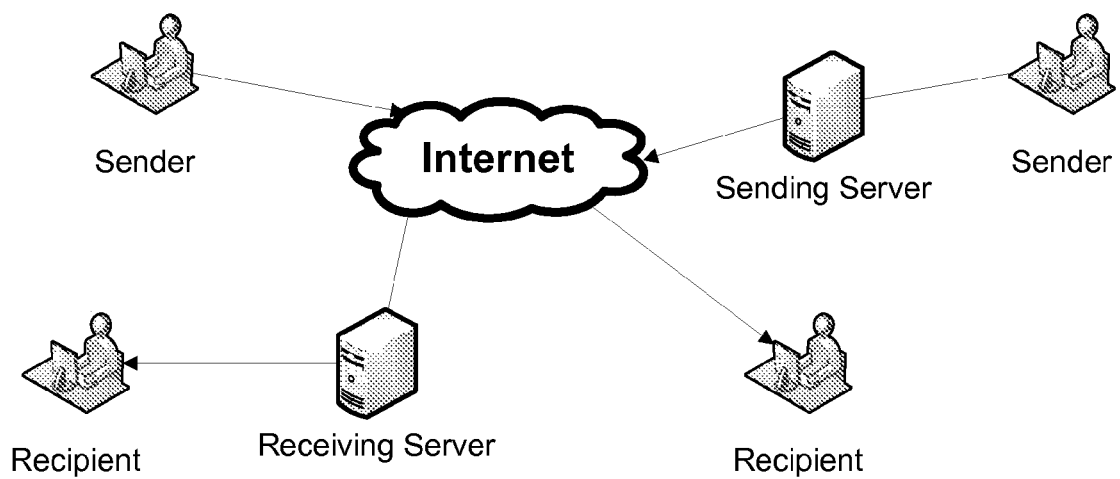

Among the most commonly used prior art electronic messaging systems are email application programs and SMS text messaging systems. FIGS. 1A-1C are schematic illustrations of three such prior art systems. In FIG. 1A, the system is server-based. FIG. 1B is an example of a point to point system. Mixed systems are also prevalent, as illustrated in FIG. 1C.

Figure 2A:
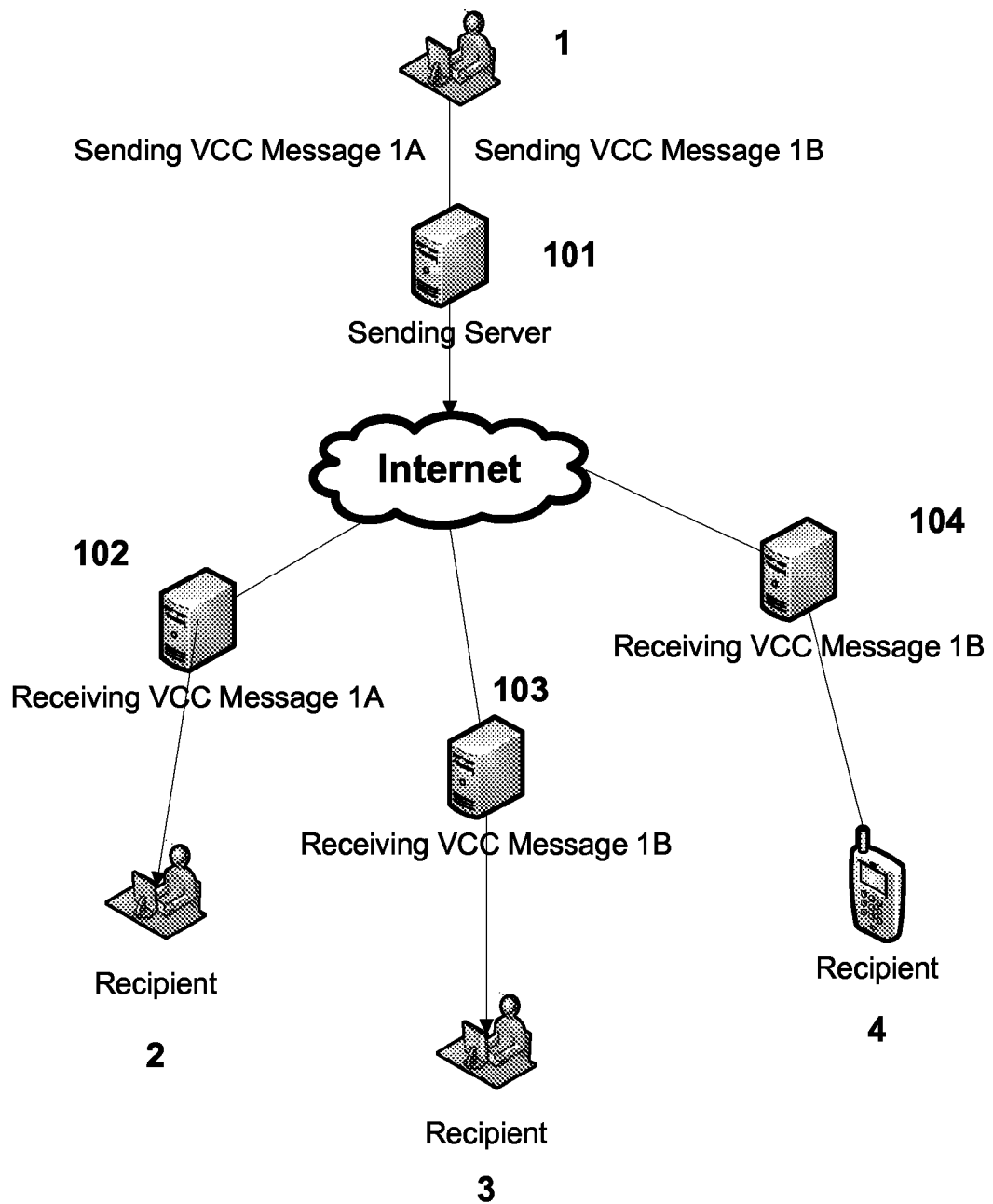
FIGS. 2A-2C are schematic diagrams of known email communications and computer systems with insertion of one embodiment of the present invention.
Figure 2B:
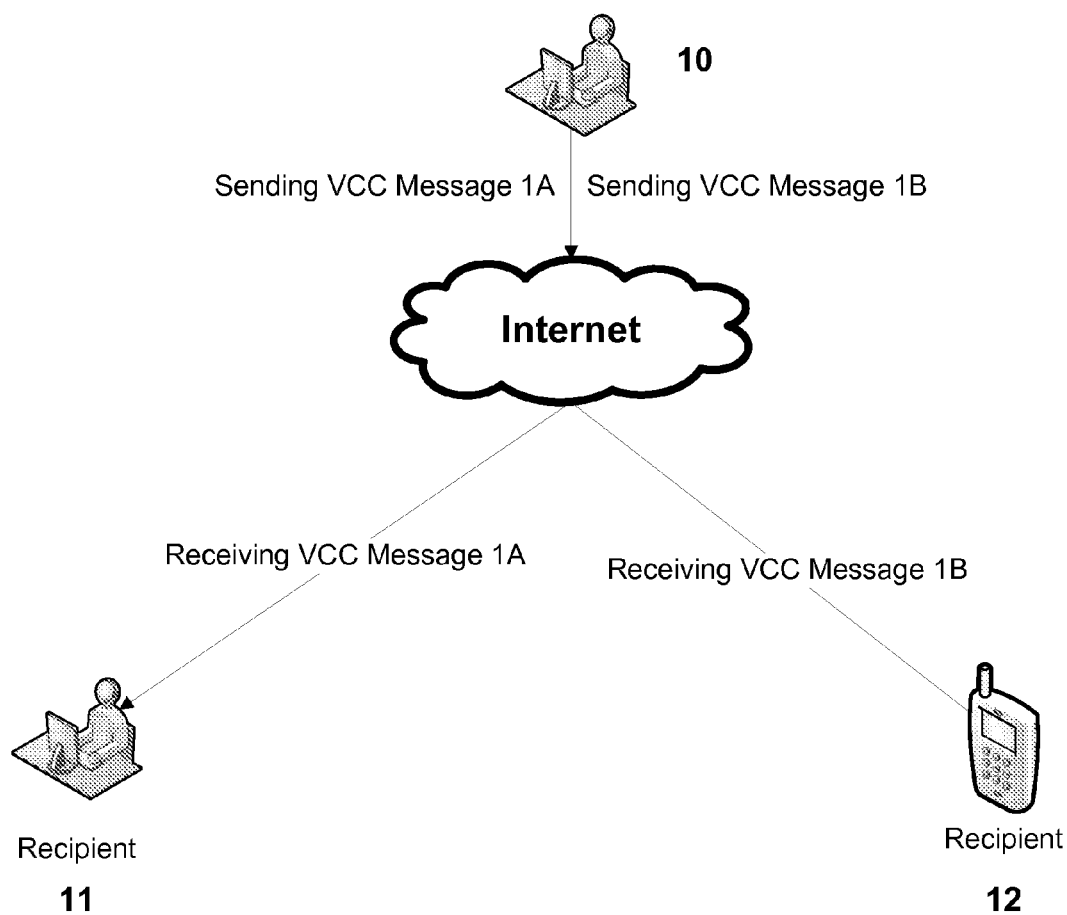
Figure 2C:
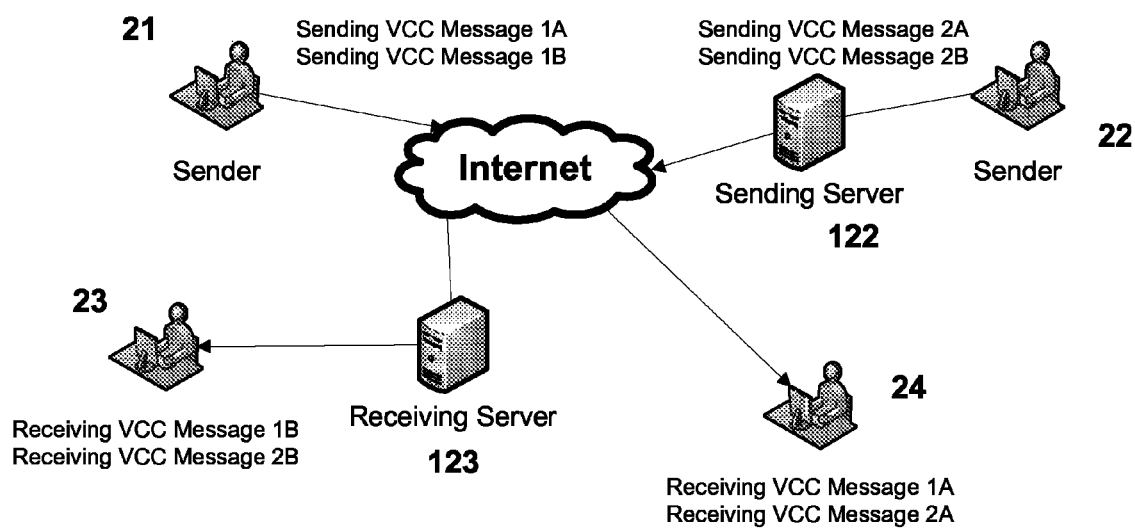

FIGS. 2A-2C are schematic diagrams showing the process of interfacing the present invention into the examples of prior art systems shown in FIGS. 1A-1C. For example, in FIG. 2A, the Sender 1 edits a message with a preferred embodiment of the VCC editor of the current invention, and thereby creating VCC Message 1A to send to Recipient 2, and a different VCC Message 1B to send to Recipients 3 and 4. As a server-based system, the VCC Message 1A is sent to the Sending Server 101, which communicates via the Internet, sending VCC Message 1A via Receiving Server 102 to Recipient 2. At the same time, the VCC Message 1B is sent to the Sending Server 101, which communicates via the Internet, sending VCC Message 1B via Receiving Server 103 to Recipient 3, and the same VCC Message 1B via Receiving Server 104 to Recipient 4.

As another example, FIG. 2B illustrates a point to point system. Here, the Sender 10 edits a message with a preferred embodiment of the VCC editor of the current invention, and thereby creating VCC Message 1A to send to Recipient 11, and a different VCC Message 1B to send to Recipient 12. As a point to point system, the VCC Message 1A is sent directly via the Internet to Recipient 11. At the same time, the VCC Message 1B is sent directly via the Internet to Recipient 12.

Finally, FIG. 2C illustrates a mixed messaging system. First, Sender 21 edits a message with a preferred embodiment of the VCC editor of the current invention, and thereby creating VCC Message 1A to send to Recipient 24, and a different VCC Message 1B to send to Recipients 23. The other Sender 22 edits a message with a preferred embodiment of the VCC editor of the current invention, and thereby creating VCC Message 2A to send to Recipient 24, and a different VCC Message 2B to send to Recipients 23. When Sender 21 sends the VCC Message 1A, it is routed directly via the Internet to Recipient 24. At the same time, the VCC Message 1B is sent directly via the Internet to Receiving Server 123 to Recipient 23. When Sender 22 sends the VCC Message 2A, it is sent to the Sending Server 122, which communicates via the Internet to Recipient 24. At the same time, the VCC Message 2B is sent to the Sending Server 122, which communicates via the Internet to Receiving Server 123 to Recipient 23.

Figure 3:
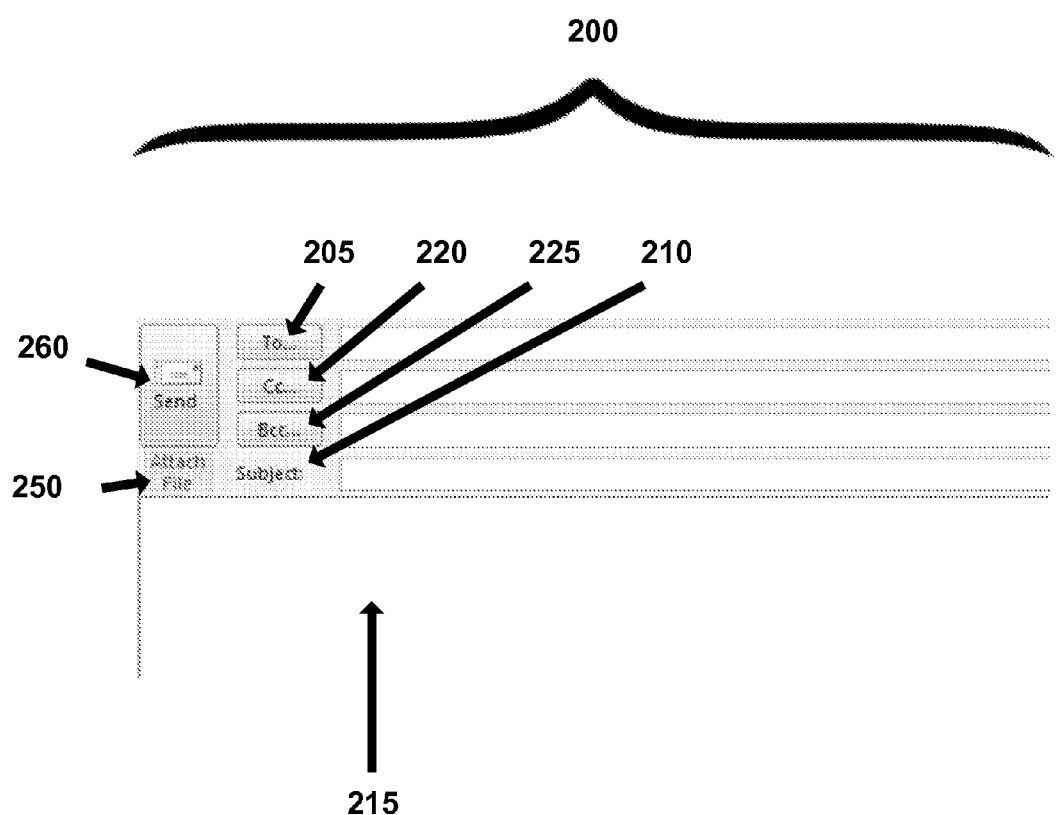
FIG. 3 is a diagram of one example of a user interface of a prior art email application.

Known prior art email application programs are typically configured to generate electronic messages in a memoranda format. An example is depicted in FIG. 3. The interface 200 embedded in the email application enables the user to write an email communication. The application provides the user with a platform that offers separate fields for entering at least one outgoing email address (the "to" field) 205, a brief topic title for the message (the "subject" field) 210, and a message field for insertion of the actual text of the message (the "body" field) 215. The application may also provide two optional separate fields, one for entering at least one outgoing email address for at least one recipient who will receive a "carbon copy" ("cc") of the message (which other recipients can review) 220, and one for entering at least one outgoing email addresses for at least one recipient who will receive a "blind carbon copy" ("bcc") (which other recipients cannot review) 225. It is also possible that the user will be allowed to designate a document, file, or executable program to be attached to and sent with the email communication. 250 When the user finishes entering the message, topic, and outgoing email addresses, the user clicks on the "send" key to transmit. 260

Figure 4:
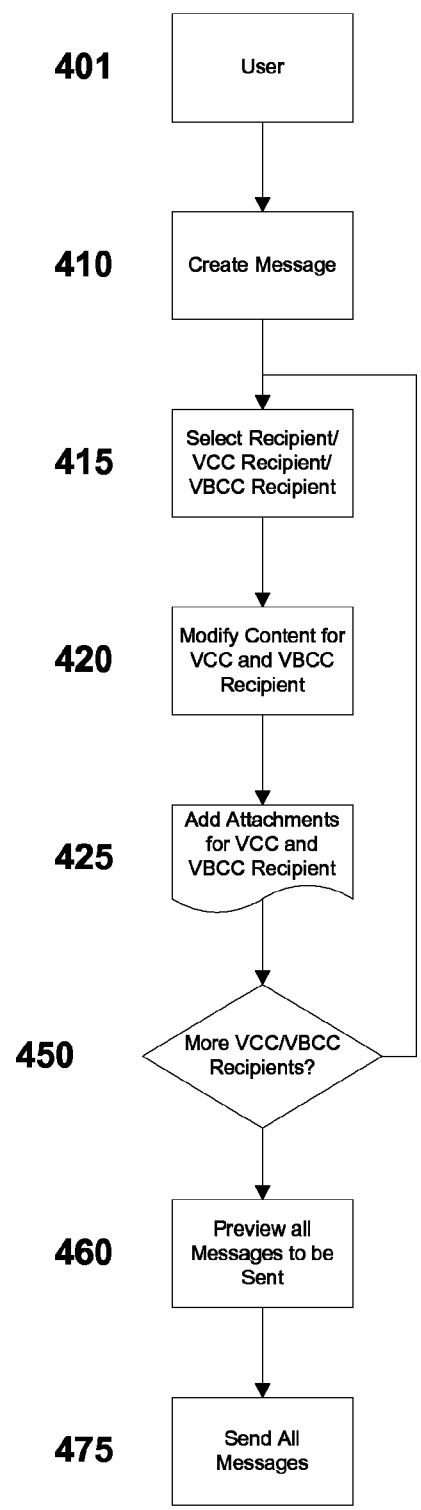
FIG. 4 is a flow diagram of a known email communications and computer network system with insertion of one embodiment of the present invention.

In FIG. 4, a flow diagram is provided to illustrate the general process of the current invention. A user 401 creates a message 410. The user next selects at least one Recipient for the message 415. The user modifies the content for a "VCC" Recipient and, if desired, for a "VBCC" Recipient 420, and the user may add and may modify via one or more attachments with the VCC editor 425. The user may then decide 450 to select additional Recipients, in which case the process of 415-420-425 is repeated as often as desired. When the user has added the last Recipient, the user has the option to review and/or print 460. Finally, the user sends the message 475.

Figure 5:
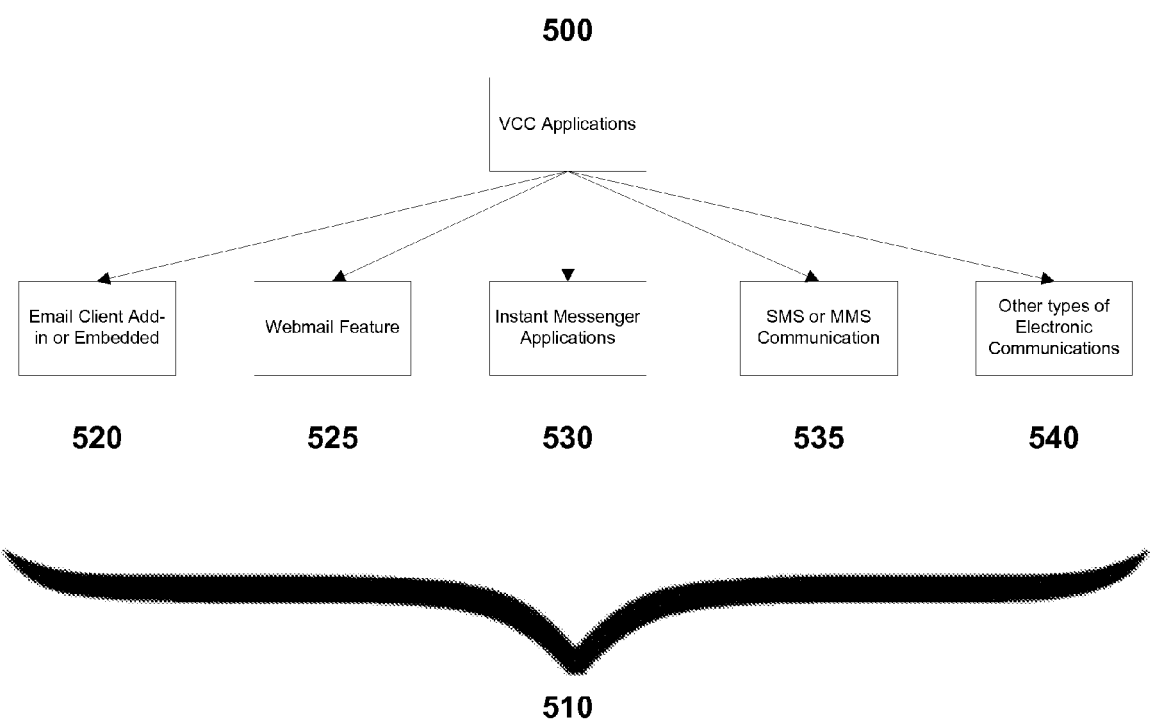
FIG. 5 is a schematic diagram of known messaging communication systems and methods that can interface with the present invention.

FIG. 5 illustrates various applications 510 that will interface with the present invention, the VCC Applications 500. In one embodiment, the method and system of the present invention can be added to or embedded into email messaging systems 520. This can be accomplished by an individual user purchasing and installing the present invention into his or her system that is currently operational or by an email messaging software provider embedding the present invention into its system as a feature thereof.

As shown in FIG. 5, the present invention can also be interfaced as a feature in webmail 525, instant messenger applications 530, and SMS and MMS communications 535.

All electronic communication systems 540 have sufficient commonalities as to allow the present invention to be interfaced as a feature therein.

Figure 6:
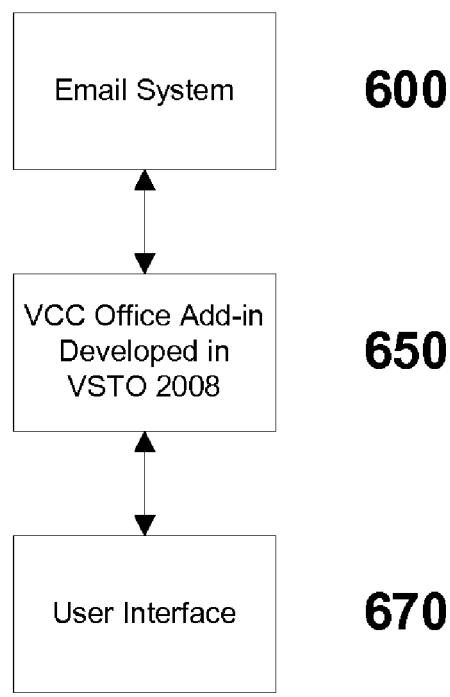
FIG. 6 is a flow diagram of one embodiment of the present invention as an add-on to an email communications application.

For convenience in explaining the present invention, the flow diagram in FIG. 6 illustrates one embodiment of the present invention as it would interface into an email messaging system 600 that is currently available in the market. An example of such a system is Microsoft Office Outlook. In this Figure, the present invention is shown as an "add-on" system 650 to the already existing email messaging system 600. Once the present invention is installed, the user would see the add-on 650 as if it were integral to the email messaging system 600. The interface 670 would be seamless. Thus, when a user composes and sends email messages, the present invention will seem as if it is part of the messaging system. Communication from the user through the present invention to the email messaging system is two-way and completely integrated.

Figure 7:
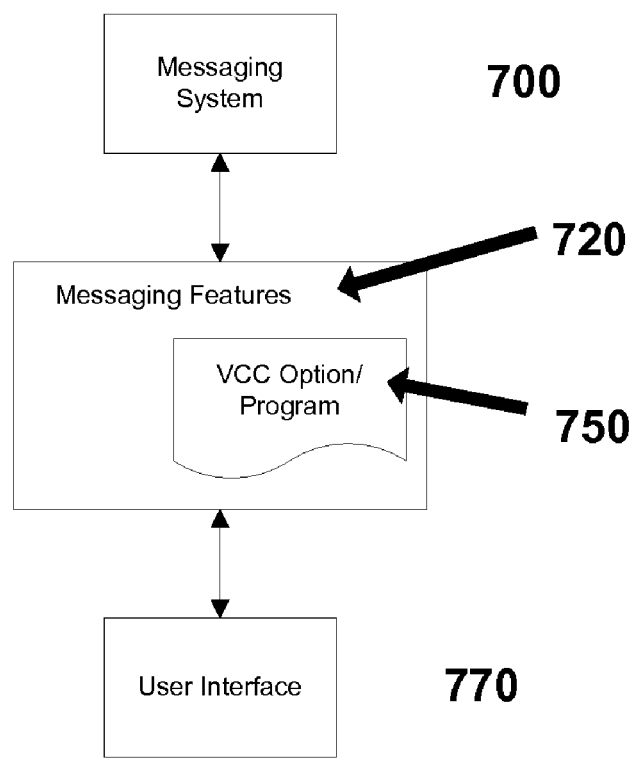
FIG. 7 is a flow diagram of one embodiment of the present invention as an embedded feature to an email communications application.

Another embodiment of this invention is shown in the flow diagram in FIG. 7 for a web messaging application. In this embodiment, the present invention is included within the messaging features 720 available to the user in the web application 700. This Figure illustrates that the present invention, the VCC Option/Program 750, can be embedded into a messaging application 600, in contrast to the add-on embodiment illustrated in FIG. 4. The interface 770 is also seamless to the user.

Figure 8:
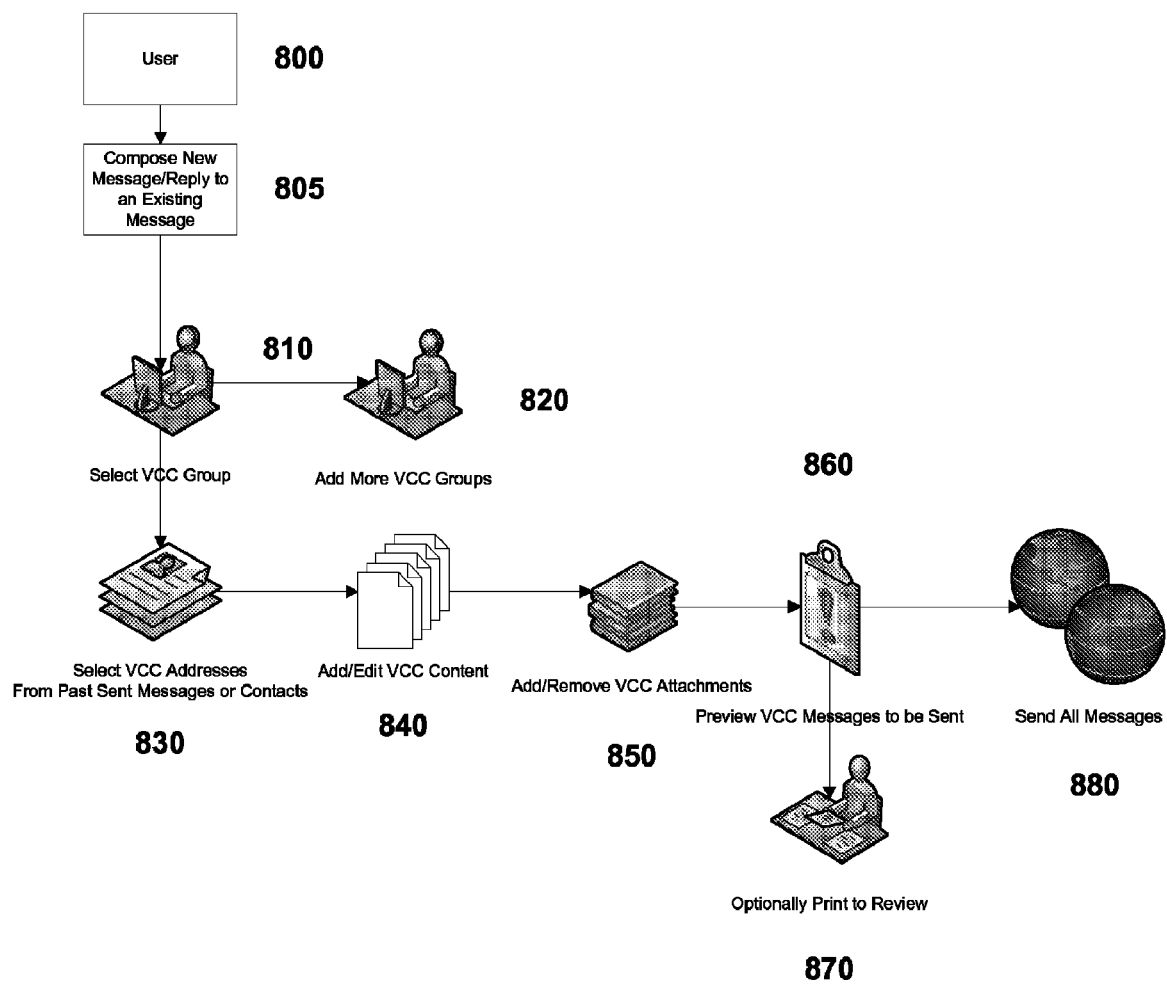
FIG. 8 is a schematic diagram of one embodiment of the present invention showing the process as utilized by the user of an email communications application.

FIG. 8 is a step-by-step schematic diagram of the present invention. The steps shown would be used regardless of which messaging application is interfaced with the present invention and regardless of whether the present invention is utilized as an add-on, an embedded feature, or otherwise.

The method begins with the user 800 composing a new electronic message or a reply message to an already existing message 805. Once the message has been composed, the user may decide that a modified message needs to be sent to a recipient other than those already selected to receive the unaltered message. Using the features of the existent messaging system, the user would select the recipients who are going to receive identical copies, whether as carbon copies or blind carbon copies. The user may then select one or more "VCC" recipients 810 using the method and system of the present invention. The addresses of these recipients may be chosen from addresses available to the user in the messaging application, such as from a saved list of contacts or from previous messages retained by the user within the application.

At this stage, the user 800 may select one or more "VCC" recipients 810 in one grouping. If the user desires to send more variations on the same message, the user may then continue to select additional groupings of one or more "VCC" recipients 820. This loop continues for so long as the user desires to add "VCC" groups of recipients within the limits of the user's software and hardware systems.

In the next stage 830, the user 800 is permitted to alter the content 840 of the electronic message and any attachments 850 thereto. The user may remove attachments completely or may exchange the attachments for other ones deemed appropriate for the recipient. The message content may be changed minimally or substantially, as preferred by the user. Content may be deleted, added, or otherwise edited. Moreover, modifications in content and attachments can be made for each group of "VCC" recipients separate from other groups of recipients.

Prior to sending any messages, the user 800 may preview all messages and groups that have been created 860. Additional changes and corrections can be made at this stage. In addition, there is an option to print the messages 870.

Finally, all of the messages are sent using the "send" feature of the electronic messaging application 880. All messages are sent at one time, including those to the "VCC," "cc," "bcc," and "to" recipients selected. When a message is transmitted, it is delivered to a known email communications system, as illustrated previously in FIGS. 1 and 2.

Figure 9:
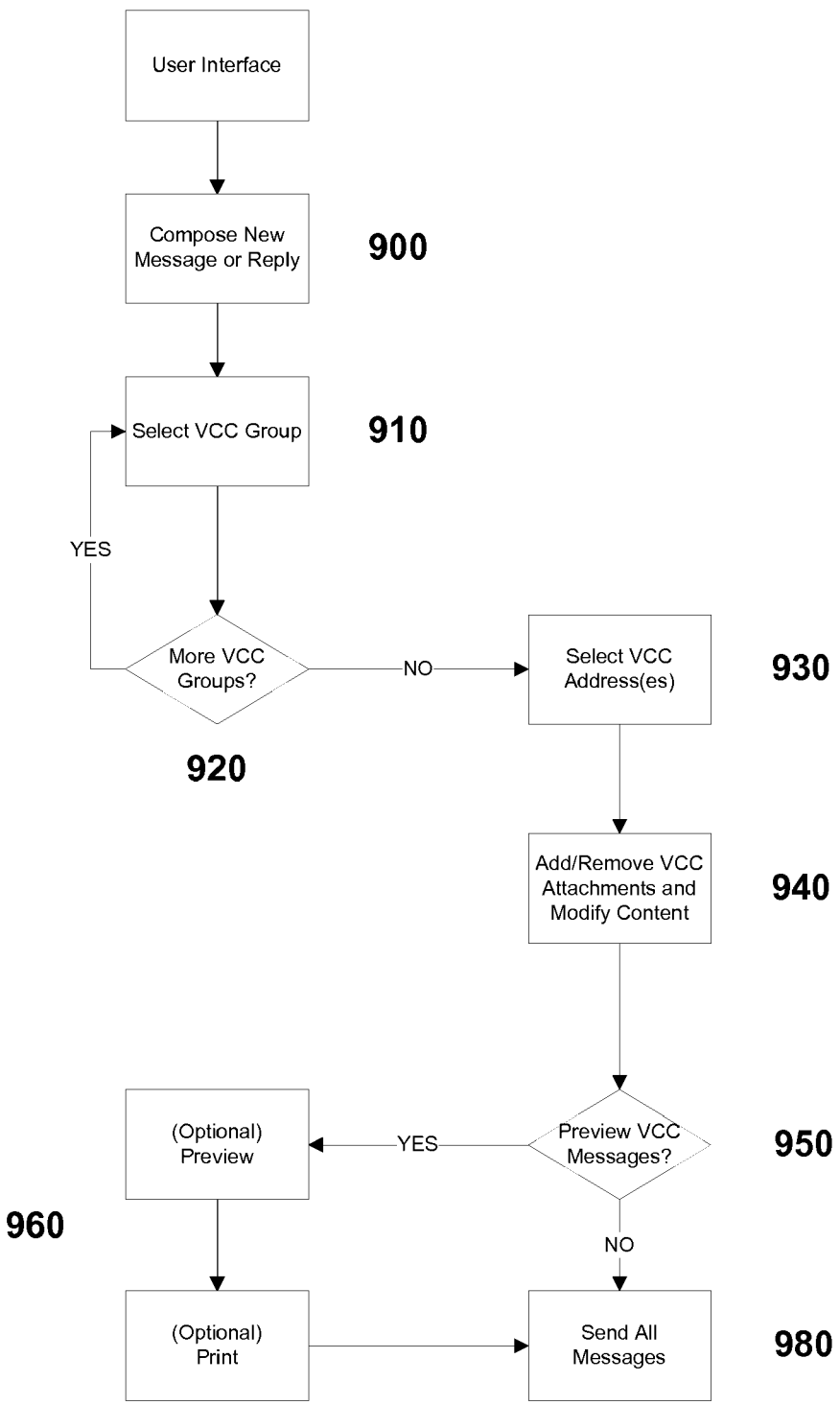
FIG. 9 is a flow diagram of one embodiment of the present invention showing the process as utilized by the user of an email communications application.

FIG. 9 is a flow diagram that illustrates the same preferred embodiment as is demonstrated in the schematic diagram shown in FIG. 8. The flow diagram is provided to further clarify the process of the present invention. As previously stated, the procedure shown would be used regardless of which messaging application is interfaced with the present invention and regardless of whether the present invention is utilized as an add-on, an embedded feature, or otherwise.

As illustrated in the flow diagram in FIG. 9, the method of the present invention begins with the user composing a new electronic message or a reply message to an already existing message 900. After composing the message, the user can modify the message and insert an outgoing email address for a secondary recipient. To do this, the user utilizes the features of the existing messaging system to select the outgoing email recipients who are going to receive identical copies, whether as carbon copies or blind carbon copies. The user may also select one or more "VCC" recipients using the method and system of the present invention. If the user desires to send more variations of the same message, the user may select groupings of at least one "VCC" recipient 910. The loop 920 continues for so long as the user desires to add "VCC" recipient groups, limited by the user's email application and hardware systems. The addresses 930 of any of these recipients may be chosen from addresses available to the user in the messaging application, such as from a saved list of contacts or from previous messages retained by the user within the application.

At the next stage, the user may further alter the content of the electronic message. Content may be deleted, added, or otherwise edited. The message content may be changed minimally or substantially, as preferred by the user. The user may additionally alter, remove, or otherwise modify any of the files, documents, or executable programs that the user may have attached to the electronic message. The user may modify content and/or attachments 940 for each group of "VCC" recipients.

Prior to sending the primary and any modified messages, the user may preview all messages and groups that have been created 950. Additional changes and corrections can be made at this stage. In addition, there is an option to print the messages 960.

Finally, all of the messages are sent using the "send" feature 980 of the existing electronic messaging application. All of the messages are transmitted at once, including the message to the primary outgoing address, the carbon copy and blind carbon copy outgoing addresses, and the VCC outgoing address. When a message is transmitted, it is delivered to a known email communications system, as illustrated previously in FIGS. 1 and 2.

Figure 10:
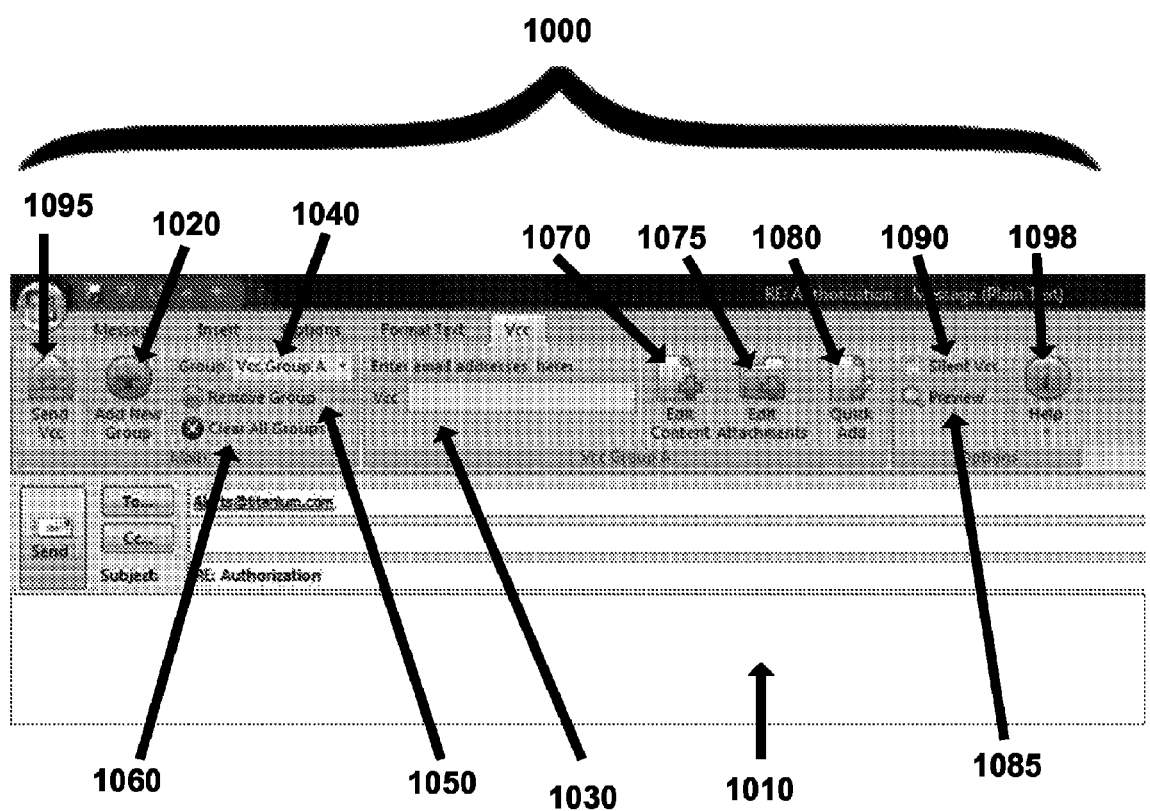
FIG. 10 is a diagram of one embodiment of the user interface of the present invention.

FIG. 10 demonstrates one embodiment of the user interface for the present invention. This Figure illustrates a menu bar 1000 that is added to the menu of an existing electronic messaging application of an email system to allow the user to access "VCC" features. The menu bar contains buttons that control the "VCC" features. By selecting these buttons with a mouse click, the user can complete the "VCC" process.

If a user wants to send a "VCC" message to several recipients, the user would first compose the message to be sent 1010. Next, the user would select the button marked "add new VCC group" 1020 to add a new field on the messaging bar so the user can add addresses for the "VCC" recipients. The user can repeat this "add" function for as many "VCC" groups as can be accommodated within the software and hardware in use.

To select recipient address for a "VCC" group, the user enters the email address in the field indicated 1030. This field will allow the user to chose from previously entered addresses that have been stored in the messaging system in past messages or in a contacts listing.

For each "VCC" group created, the user next selects the group using the drop-down menu field 1040. If the user decides to delete any particular "VCC" group, the user may select the group using the drop-down menu and then select the "remove group" button 1050. It is also possible to delete all of the groups created by selecting the "clear all groups" button 1060.

After a "VCC" group has been created, the user will select that group 1040 and then select the "edit content" button 1070. This button allows the user to alter any content in the message. To modify attachments included with the message, the user selects the button identified as "edit attachments" 1075. As an added convenience, the user may select the "quick add" button while editing the message 1080. This option allows the user to add content that the user has highlighted in another "VCC" group message into the currently showing group's message.

The user may further select the "preview" button to review all of the messages before they are sent 1085, at which point the user may send any of the messages to print if preferred. There is an optional "silent VCC" button 1090 that the user may select to maintain the "VCC" group as invisible to the recipients, in the same fashion as a "blind carbon copy ("bcc")".

Finally, when all modifications are made and groups of recipients are created, the user selects the "send" button of the messaging application 1095. By selecting this button, the user will cause all messages to be sent at one time.

The present invention also includes a "help" button that the user may select 1098. Selection of this button will activate an online connection to a website where the user can receive tips and explanations about using the "VCC" application.

What is claimed is:

1. A method of providing transmission, over an Internet, of a primary electronic message to one or more primary recipients and a first edited message to one or more secondary recipients, comprising:

utilizing a user interface with a known electronic messaging system application; composing the primary electronic message, using the known electronic messaging system application, that includes message content and has a first recipient field, a second recipient field, a third recipient field and a fourth recipient field;

assigning the one or more primary recipients to the first recipient field, using the known electronic messaging system application, the one or more primary recipients to receive the message content in an unedited form;

editing the message content of the primary electronic message, using the known electronic messaging system application, creating the first edited message having a first edited message content, the first edited message content is different than the unedited message content;

assigning at least one of the one or more secondary recipients to the fourth recipient field, using the known electronic messaging system application, where the at least one of the one or more secondary recipients assigned to the fourth recipient field receives the first edited message;

editing the message content of the primary electronic message, using the known electronic messaging system application, creating a second edited message having a second edited message content, the second edited message content is different than the unedited message content and the first edited message content;

transmitting the primary electronic message directly from the known electronic messaging system application to the one or more primary recipients assigned to the first recipient field via the Internet; and transmitting the first edited message directly from the known electronic messaging system application to the one or more secondary recipients assigned to the fourth recipient field via the Internet, wherein the first recipient field represents a list of "to" recipients, the second recipient field represents a list of carbon copy ("cc:") recipients, the third recipient field represents a list of blind carbon copy ("bcc:") recipients and the fourth recipient field represents a list of visible carbon copy ("vcc:") recipients, wherein the first visible carbon copy recipient is invisible to the second visible carbon copy recipient and the second visible carbon copy recipient is invisible to the first visible carbon copy recipient; and wherein the carbon copy recipients and the blind carbon copy recipients, and the corresponding electronic messages, are visible to the first and second visible carbon copy recipients.

2. The method of claim 1, wherein the first edited message is transmitted to the one or more secondary recipients assigned to the fourth recipient field simultaneously with the transmission of the primary electronic message to the one or more primary recipients assigned to the first recipient field.

3. The method of claim 1, further comprising assigning additional secondary recipients from the at least one of the one or more secondary recipients to the second recipient field and the third recipient field.

4. The method of claim 1, wherein the visible carbon copy recipients are invisible to the carbon copy recipients and the blind carbon copy recipients.

5. The method of claim 1, wherein a visible carbon copy recipient is a single recipient.

6. The method of claim 1, wherein a visible carbon copy recipient is a group of recipients, each recipient in the group of recipients receives the first edited message content.

7. The method of claim 1, wherein the primary electronic message and the first edited message are unable to be transmitted until a preview of the primary electronic message and the first edited message to be sent to each recipient is displayed to ensure all recipients receive an intended form of the electronic message.

8. The method of claim 1, wherein the message content includes text and/or file attachments.

9. The method of claim 1, wherein the second visible carbon copy recipient is selected from a previously created group of recipients.

10. The method of claim 1, wherein the second visible carbon copy recipient is dynamically generated within the electronic message.

* * * * *